Aug. 28, 1956 N. WYETH 2,760,604
SHOCK ABSORBER
Filed July 21, 1953 2 Sheets-Sheet 1

INVENTOR.
NATHANIEL WYETH.
BY E. C. McRae
J. R. Faulkner
T. H. Oster
ATTORNEYS

Aug. 28, 1956   N. WYETH   2,760,604
SHOCK ABSORBER

Filed July 21, 1953   2 Sheets-Sheet 2

INVENTOR.
NATHANIEL WYETH.
BY E. C. McRae
J. R. Faulkner
T. H. Oster
ATTORNEYS

United States Patent Office 2,760,604
Patented Aug. 28, 1956

2,760,604

SHOCK ABSORBER

Nathaniel Wyeth, Dearborn, Mich., assignor to Ford Motor Company, Dearborn, Mich., a corporation of Delaware Application July 21, 1953, Serial No. 369,393

6 Claims. (Cl. 188—88)

This invention relates generally to hydraulic shock absorbers and refers more particularly to improvements in direct acting shock absorbers for motor vehicles.

An object of the present invention is to provide a hydraulic shock absorber adapted to be connected between sprung and unsprung parts of a motor vehicle and arranged to effectively prevent excessive relative movement between these parts. This is accomplished by providing a hydraulic cutoff arranged to automatically close communication through the shock absorber piston and through the blowoff valve at a predetermined point in the compression stroke of the piston to trap a quantity of oil in the shock absorber to form a fluid buffer against further relative movement between the shock absorber parts and between the sprung and unsprung parts of the vehicle.

A further object of the invention is to accomplish the hydraulic cutoff by means of a resilient bumper having inherent cushioning qualities cooperating with the trapped fluid to cushion the checking of the compression stroke of the shock absorber.

Still another object of the invention is to provide a hydraulic shock absorber having a multiple stage cutoff system arranged to progressively decrease and finally completely cut off the flow of fluid from the shock absorber cylinder during the compression stroke of the piston. This is accomplished by providing a construction in which the passage through the piston and the passage through the blowoff valve are closed in sequence, one of these passages being completely closed prior to the closing of the other passage so as to minimize the shock load and provide a controlled dampening of the relative movement between the sprung and unsprung parts of the vehicle during the final stages of the compression stroke of the shock absorber.

Other objects and advantages of this invention will be made more apparent as this description proceeds, particularly when considered in connection with the accompanying drawings, wherein.

Figure 1:
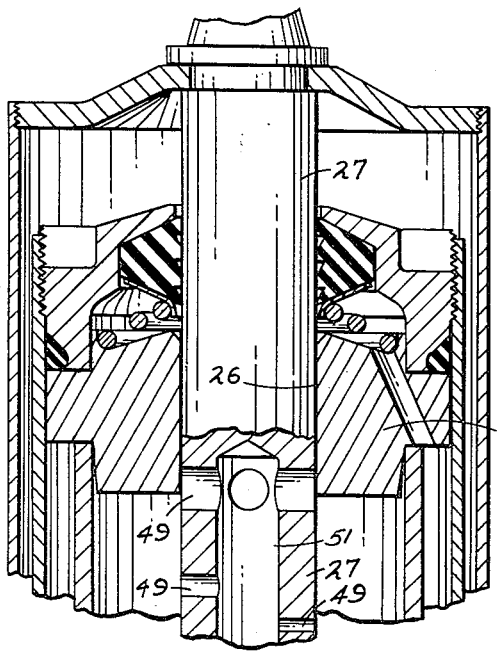
Figure 1 is a transverse cross sectional view through the independent front wheel suspension of a motor vehicle incorporating the present invention.
Figure 1:
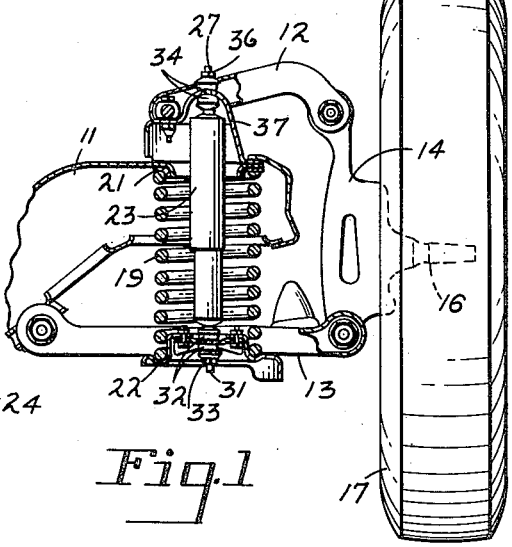

Referring now to the drawings, and particularly to Figure 1, there is shown a conventional front wheel suspension for a motor vehicle. The reference character 11 indicates a transverse cross frame member pivotally supporting an upper suspension arm 12 and a lower suspension arm 13. The upper and lower ends of a spindle support 14 are pivotally connected to the outer ends of the upper and lower suspension arms respectively. The wheel spindle 16 rotatably supports a vehicle wheel 17, and compression spring 19 is mounted between a spring seat 21 provided on the frame cross member 11 and a spring pan 22 carried by the lower suspension arm 13. A tubular directing shock absorber 23 is also connected between the cross frame member 11 and the spring pan 22.

Figure 2:
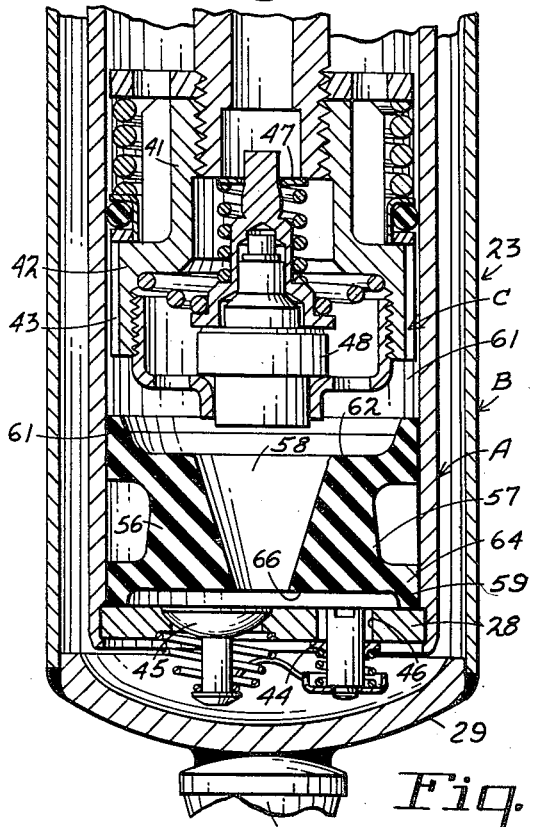
Figure 2 is an enlarged cross sectional view of the shock absorber shown in Figure 1.

As best seen in Figure 2, A is the pressure cylinder, B the reserve chamber and C the piston assembly of the shock absorber 23. The pressure cylinder A is tubular in form and is provided at its upper end with a guide bushing 24 forming a closure member for the cylinder. The guide bushing 24 has a central bore 26 for slideably receiving the piston rod 27 which in turn carries at its lower end the piston C.

Reserve cylinder B is likewise tubular in form and encircles the pressure cylinder A, providing a chamber therebetween for reserve fluid. At its upper end the reserve cylinder B is supported upon the guide bushing 24.

At their lower ends the pressure cylinder A and reserve cylinder B are joined by interconnected closure members 28 and 29, the latter being welded to the upper end of the short rod 31. Referring again to Figure 1, the rod 31 is attached to the spring pan 22 by means of rubber grommets 32 and a threaded nut 33. The pressure cylinder A is thus attached to the lower suspension arm and hence to the unsprung portion of the wheel suspension.

The upper end of the piston rod 27 extends beyond the upper ends of the cylinders A and B and is attached by means of grommets 34 and a nut 36 to a bracket 37 fixedly mounted upon the cross frame member 11. The piston rod and the piston carried thereby are thus connected to a sprung portion of the vehicle chassis.

Figure 3:
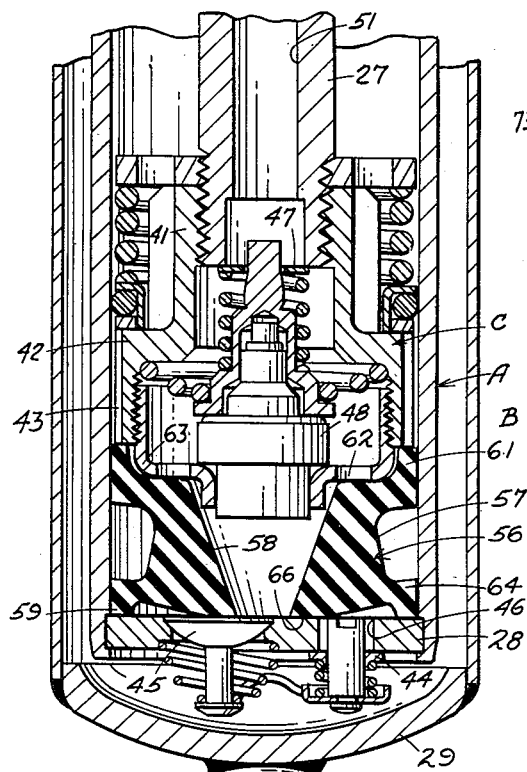
Figure 3 is an enlarged fragmentary cross sectional view of a portion of the shock absorber shown in Figure 2, shown in another position.

Referring now to Figures 2 and 3, the lower end of the piston rod 27 threadedly engages the hub 41 of the piston C. The periphery of the enlarged body portion 42 of the piston C is formed with a plurality of circumferentially spaced elongated grooves 43 providing for the passage of fluid from one end of the cylinder to the other during the compression stroke of the shock absorber. Thus, when the wheel 17 moves upwardly to compress the suspension spring 19, the pressure cylinder A is moved upwardly relative to the piston C and fluid is displaced from the portion of the cylinder below the piston through the peripheral piston grooves 43 to the portion of the cylinder above the piston.

A spring loaded blowoff valve 44 is mounted upon the closure member 28 at the lower portion of the cylinder A to control the passage 46 therethrough. During the compression stroke of the piston C the valve 44 opens to permit the escape of excess fluid from the lower portion of the cylinder into the reserve chamber formed between the cylinders A and B. This transfer of fluid is necessitated by the displacement of the piston rod 27 in the upper portion of the cylinder A.

The construction thus far described is conventional in direct acting shock absorbers for motor vehicles. In addition, the piston C of the shock absorber incorporates a rebound valve 47 controlled by a temperature responsive device 48 to provide a variable dampening effect during the rebound stroke of the piston. This construction is more fully described in my copending application Serial No. 345,612. The shock absorber also incorporates radial passageways 49 formed at various places along the length of the piston rod 27 and communicating with the axial passageway 51 formed in the piston rod to provide a multiple stage hydraulic cutoff system arranged to progressively decrease and finally cut off the flow of oil through the valved piston during the rebound stroke. This feature is more fully described in my Patent 2,604,193.

Referring now to Figures 2 and 3, the shock absorber incorporates a cylindrical rubber block 56 seated upon the closure member 28 within the lower portion of the pressure cylinder A. The diameter of the block is such as to provide a tight fit between the block and the cylinder so as to retain the block in position against the closure member 28.

The block 56 is formed with an annular groove 57 around its periphery and with a centrally located axially extending conical passageway 58 extending completely through the block. An annular rib 59 on the lower face of the block 56 adjacent the periphery thereof engages the closure plate 28 and spaces the body portion of the block from the plate so as to normally provide clearance for fluid communication between the portion of the cylinder above the block 56 and the valve 44 and 45 between the pressure cylinder and the reserve chamber. The rubber block 56 is also formed with an annular rib 61 on the upper face of the block adjacent the periphery thereof, for a purpose to be described more in detail hereinafter.

During the compression stroke of the shock absorber, the piston C is moved downwardly in the pressure cylinder A, and as previously mentioned, fluid flows from the lower portion beneath the piston C through the grooves 43 to the portion of the cylinder above the piston. Due to the displacement of the piston rod 27, the upper portion of the cylinder cannot accommodate all of the fluid thus displaced from the lower portion of the cylinder and the excess fluid is forced through the conical passageway 58 in the rubber block 56 and through the blowoff valve 44 to the reserve chamber between the pressure cylinder A and reserve cylinder B. As the piston C nears the lower limit of its downward travel in the cylinder A, the lower portion of the piston engages the upper portion of the rubber block 56, as best seen in Figure 3. It will be noted that the annular rib 61 on the upper face of the rubber block 56 engages the peripheral portion of the lower face of the piston C and closes the peripheral grooves 43 through the piston. Communication is thus cut off between the cylinder on opposite sides of the piston although fluid can still escape through the valve 44 in the closure plate 28.

The annular shoulder 62 formed by the upper face of the body portion of the rubber block 56 engages the lower surface of the cup-shaped end cap 63 of the piston C, and it will be seen from Figure 3 that continued downward pressure of the piston C upon the rubber block 56 causes the lower portion thereof to become distorted as shown. This distortion occurs by reason of a collapse in the reduced neck portion 64 of the rubber block between the lower annular rib 59 and the peripheral annular groove 57, resulting in the central portion of the offset lower face 66 of the rubber block 56 being forced into engagement with the closure plate 28 to provide a seal preventing further fluid communication between the cylinder and the passageway 46 through the closure plate 28. Under these circumstances, the remaining fluid in the lower portion of the cylinder is trapped and forms a fluid block checking the compression stroke of the piston and the relative movement between the sprung and unsprung parts of the vehicle. The inherent resilience of the rubber block 56 provides a cushioning effect dampening the shock load.

With the foregoing arrangement it will be seen that a multiple stage cushioned hydraulic cutoff is provided for the pressure stroke of the piston as well as for the rebound stroke thereof, thus providing complete hydraulic control.

Figure 4:
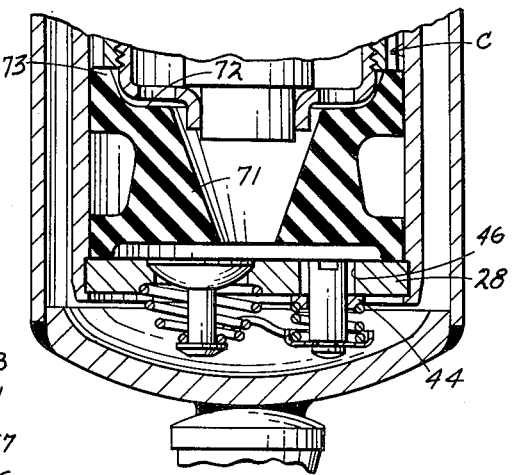
Figure 4 is a cross sectional view similar to a portion of Figure 3 but showing a modification.

Reference is now made to Figure 4 which illustrates a modification of the construction shown in Figures 1 to 3 inclusive. The rubber block 71 is identical in construction to the rubber block 56 of Figure 3, with the exception that the shoulder 72 is further offset with respect to the annular rib 73 at the upper face of the rubber block so as to cause engagement of the rib 73 with the piston C prior to engagement of the shoulder 72 with the piston. This construction further retards the multiple stage cutoff in that a greater downward movement of the piston C is required to engage the shoulder 72 of the rubber block and to deform the latter downwardly to close the blowoff valve 44. During this retarded cutoff, the resilience of the rubber bumper provides added cushioning effect.

Figure 6:
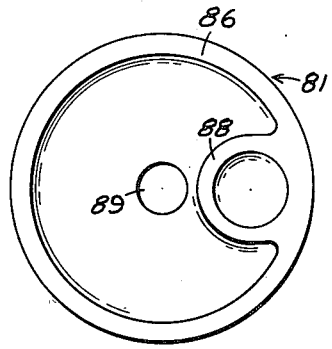
Figure 6 is a bottom plan view of the rubber bumper shown in Figure 5.
Figure 5:
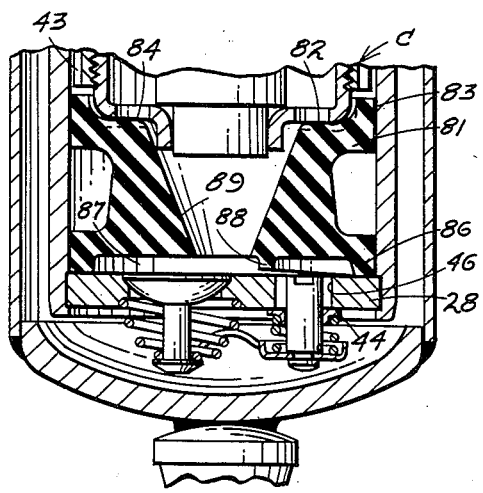
Figure 5 is a view similar to Figure 4 but showing another modification.

Figures 5 and 6 illustrate a further modification of the invention. The rubber block 81 of this construction is formed in such manner that the annular shoulder 82 contacts the adjacent portion of the piston C prior to engagement of the annular rib 83 with the piston. Generally radially extending grooves 84 are formed in the annular shoulder portion 82 of the upper face of the rubber block to permit fluid communication between the portion of the cylinder beneath the piston and the upper portion of the cylinder through the peripheral piston grooves 43 even after the piston has engaged the block 81.

The lower face of the block 81 is formed with a peripheral rib 86 forming an upwardly offset face 87. In addition, as best seen in Figure 6, the lower face of the block is formed with an integral inclined circular rib 88 at one side of the central opening 89 of the block. The rib 88 merges into the annular rib 86 and upon downward deformation of the rubber block 81 under the pressure of the piston C, the rib 88 engages the closure plate 28 and forms a seal around the passageway 46 therethrough. This cuts off communication through the passageway 46 and the blowoff valve 44. Subsequently, continued downward movement of the piston C deforms the rubber block until the annular rib 83 engages the lower face of the piston C to seal the peripheral grooves 43 therethrough. Thus, it will be seen that this construction provides a multiple stage cutoff operating in reverse to the multiple stage cutoff provided by the previous modifications and functioning to first close the communication through the blowoff valve 44 and subsequently close communication through the piston peripheral ports 43.

Figure 7:
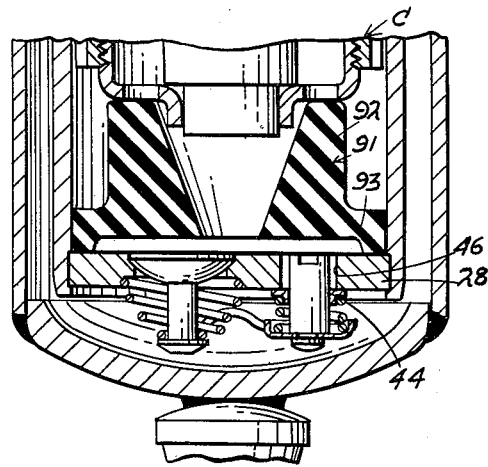
Figure 7 is a cross sectional view similar to Figures 4 and 5, but showing another modification.

Referring now to Figure 7, a further modification of the invention is shown. In this construction, the rubber block 91 is formed by the cylindrical body portion 92 the upper end of which contacts the lower face of the piston C as the piston reaches the end of its compression stroke. Further movement of the piston causes flexing of the rubber block 91 in the narrow neck portion 93 to collapse the block and close communication through the passageway 46 in the closure plate 28.

It will be understood that the invention is not to be limited to the exact construction shown and described, but that various changes and modifications may be made without departing from the spirit and scope of the invention, as defined in the appended claims.

What is claimed is:

1. A direct acting hydraulic shock absorber for a motor vehicle adapted to be mounted between sprung and unsprung parts of the vehicle, comprising a pressure cylinder attached to one of said parts, a piston reciprocable in said cylinder and attached to the other of said parts, said piston having a passageway therethrough providing communication between the cylinder on opposite sides of the piston, a closure member for one end of said cylinder formed with a passageway therethrough, and a unitary resilient member of elastomeric properties within said one end of the cylinder having a portion adapted to be engaged by said piston during the compression stroke of the latter to block communication through the passageway in said piston and a second portion overlying the passageway in said closure member to block communication through said last mentioned passageway to trap a body of fluid in said pressure cylinder.

2. The structure defined in claim 1 which is further characterized in that said resilient member is formed with a passageway therethrough normally establishing communication between said one end of the cylinder and the passageway in said closure member, and said resilient member having a deformable portion arranged to engage said closure member and block communication through the passageway in the closure member after a predetermined movement of said resilient member by said piston.

3. A direct acting hydraulic shock absorber for a motor vehicle adapted to be mounted between sprung and unsprung parts of the vehicle, comprising a pressure cylinder attached to one of said parts, a piston reciprocable in said cylinder and attached to the other of said parts, said piston having a passageway therethrough extending axially through the piston adjacent the periphery thereof and providing communication between the cylinder on opposite sides of the piston, a closure member for one end of said cylinder formed with a passageway therethrough, and a resilient member having an annular peripheral rib facing the adjacent end of the piston and engageable thereby during the compression stroke of the piston to close the adjacent end of the piston passageway to block communication between opposite ends of the cylinder through the piston, said resilient member also having a deformable rib engageable with said closure member during further movement of said piston in its compression stroke to block communication through the passageway in said closure member.

4. A direct acting hydraulic shock absorber for a motor vehicle adapted to be mounted between sprung and unsprung parts of the vehicle, comprising a pressure cylinder attached to one of said parts, a piston reciprocable in said cylinder and attached to the other of said parts, a closure member closing one end of said cylinder, passageways in said piston and in said closure member for the escape of fluid from said one end of the cylinder during the compression stroke of said piston, and a cylindrical resilient member within said one end of the cylinder, said resilient member having portions at the opposite sides thereof arranged to block communication through the passageways in said cylinder and in said closure member upon engagement of said resilient member by said piston.

5. The structure defined by claim 4 which is further characterized in that said portions of the resilient member are engaged with said piston and said closure member in sequence so as to close one of said passageways prior to the closing of the other of said passageways.

6. The structure defined by claim 4 which is further characterized in that said resilient member comprises a cylindrical rubber block having an annular groove formed around its periphery, said block having a passageway extending axially therethrough with said passageway being laterally offset from the passageway in said closure member, and said rubber block having oppositely facing annular ribs adjacent the periphery of the block with one of said ribs being adapted to engage said piston and the other of said ribs being adapted to engage said closure member, the annular peripheral groove of the rubber block forming a narrow neck portion between the groove and the second mentioned annular rib to permit deformation of the latter upon engagement of the block by the piston to form a seal blocking communication between the axially extending passageway in the block and the passageway in the closure member.

References Cited in the file of this patent

UNITED STATES PATENTS

| | | |
|---|---|---|
| 1,200,199 | Johnson | Oct. 3, 1916 |
| 1,592,912 | Thompson | July 20, 1926 |
| 2,379,750 | Rossman | July 3, 1945 |
| 2,599,477 | Patriquin | June 3, 1952 |
| 2,619,199 | Schwary | Nov. 25, 1952 |